F. CONRAD.
CUT-OUT.
APPLICATION FILED APR. 2, 1913.
1,229,719.
Patented June 12, 1917.
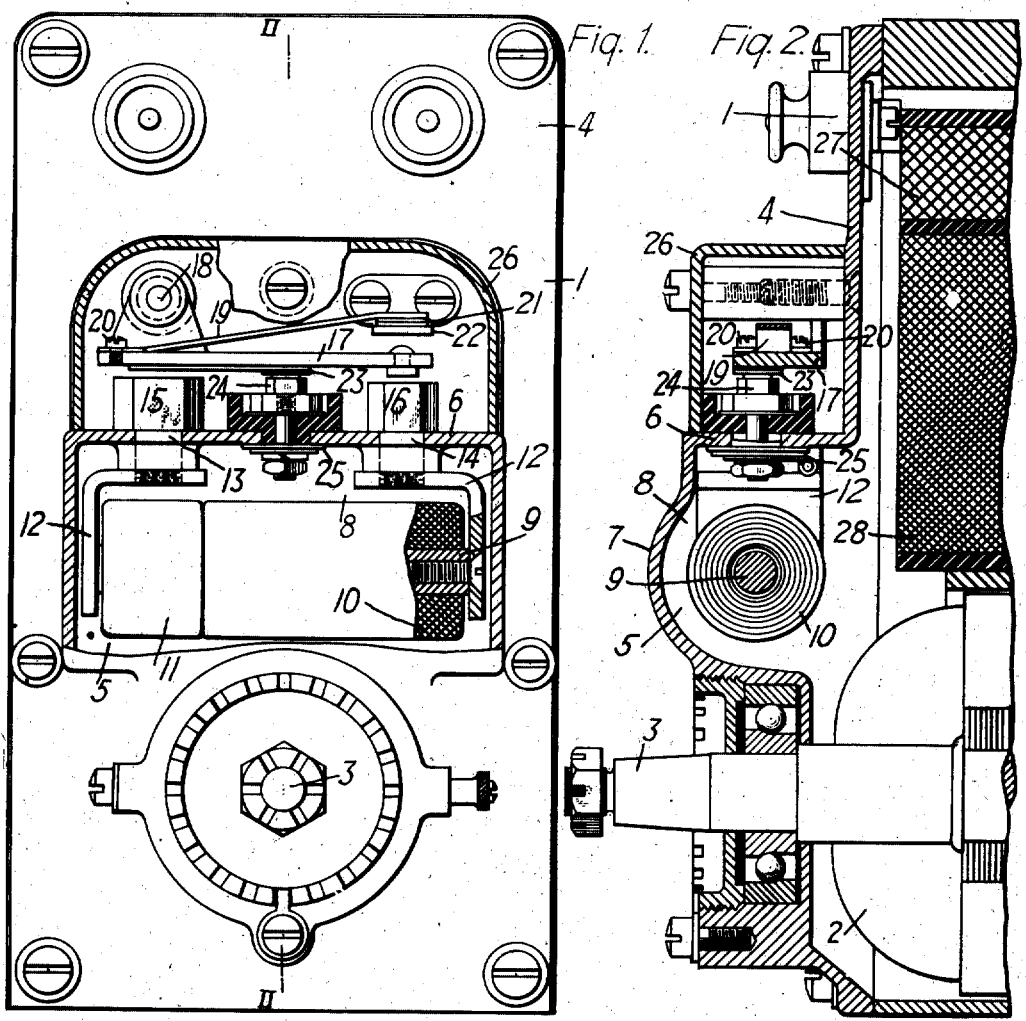
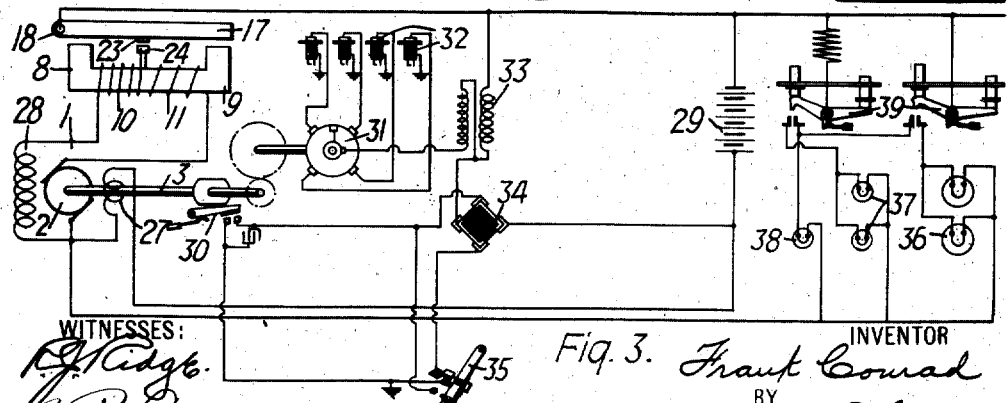
WITNESSES:
P. J. Ridge.
J. R. Langley.
INVENTOR
Frank Conrad
BY
Wiley & Carr
ATTORNEY

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

CUT-OUT.

1,229,719.   Specification of Letters Patent.   Patented June 12, 1917.

Application filed April 2, 1913. Serial No. 758,311.

*To all whom it may concern:*

Be it known that I, FRANK CONRAD, a citizen of the United States, and a resident of Swissvale, in the county of Allegheny and State of Pennsylvania, have invented a new and useful Improvement in Cut-Outs, of which the following is a specification.

My invention relates to cut-outs or switches for use in connection with such dynamo-electric machines as may be employed in charging storage batteries of electrical systems.

My invention has for one of its objects to provide a device of the above indicated character that is simple in structure and automatic in operation to control the circuits of an electrical system.

Another object of my invention is to provide a suitable construction whereby the cut-out may be assembled with the generator parts and form a unitary structure therewith.

It has been proposed to use a speed-controlled device, such as a centrifugal switch, for closing a circuit comprising a generator and a battery at a predetermined speed to correspond with the desired voltage, and for opening the same when the speed falls below this value. While these devices have proven fairly efficient, it is possible that the normal relation between the voltage and the speed of the generator may be changed by any abnormal condition, such as a loose field winding connection. The centrifugal device would operate at the same predetermined speed to close the charging circuit and, as a result, the battery would discharge back through the generator. This action may result in the demagnetization of the field magnets. There is a possibility, also, that the battery may be overcharged by operating the generator at an excessive speed. When the speed decreases, the switch will not open until the minimum speed is reached. Before the switch opens, the voltage of the battery may exceed that of the generator and thus cause the battery to discharge back through the generator.

My invention provides a switch which automatically closes the charging circuit at a predetermined voltage and opens the circuit when current begins to flow from the battery to the generator, thus acting as an "electric valve."

The advantages of this device are that the circuit cannot be closed until the voltage of the generator is sufficiently high to charge the battery and no current can flow through the generator from the battery. This device may be used with particular advantage in connection with systems for automobiles, where the speed is variable and the charging operation is more or less intermittent.

In the drawings, Figure 1 is an end view of a generator, partially in elevation and partially in section, with my invention applied thereto. Fig. 2 is a sectional view on line II—II of Fig. 1, part of the generator being broken away. Fig. 3 is a diagrammatic view of circuits and apparatus embodying my invention.

Referring particularly to Figs. 1 and 2, a generator 1 is provided with an armature 2, an armature shaft 3, and an end casing 4 that is made of an alloy or metal that is nonmagnetic. The casing 4 is provided with a chamber or recess 5 inclosed by a flat top member 6 and a curved side member 7 that are integral parts of the casing 4. The chamber 5 forms a housing for a cut-out 8.

The cut-out comprises a core member 9 and two coils 10 and 11 therefor that are wound to assist each other. Pole pieces 12 are attached to the core 9 at its respective ends and are bent at right angles toward each other in a plane parallel to the axis of the core member. The pole pieces 12 are fastened to the member 6 by bolts 13 and 14. The respective heads 15 and 16 of the bolts are outside the chamber 5 and form extensions of the pole pieces 12. An armature 17 having a pivotal support at 18 and being insulated from the casing 5, is normally held in its uppermost position by a spring 19 that is connected to the armature 17 at one end by screws 20. The spring 19 is provided at its opposite end with a contact member 21 to engage a contact member 22 that is insulated from, and supported by, the casing 4. A contact member 23 is mounted on the under side of the armature 17 to engage a contact member 24 when the armature 17 is in its lower position. The contact member 24 is connected to a terminal 25 that is supported by, and insulated from, the member 6, and is connected to the coils 10 and 11. That portion of the cut-out which lies without the chamber 5 is inclosed by a removable cover member 26.

It will be noted that, by means of the construction above described, the stationary portion of the cut-out is permanently inclosed where it will be effectually protected. The coils of the cut-out may be conveniently connected to the generator leads inside the generator structure. The contact members of the cut-out are readily accessible for inspection and adjustment.

Referring particularly to Fig. 3, the generator 1 is provided with a series field winding 27 and a shunt field winding 28. The coil 10 is connected in series with the shunt field winding 27 and the coil 11 is connected in series with the generator armature winding. These connections are preferably made within the generator structure and form a portion of the interior circuits of the generator. A storage battery 29 is connected directly to one terminal of the generator and is connected to the other terminal of the generator by connections that are controlled by the cut-out 8.

An ignition system is supplied with current by the generator or by the battery, according to circuit conditions. The ignition system comprises an interrupter 30 on the armature shaft 3, a distributer 31, spark plugs 32, an induction coil 33, a plug switch 34, and a starting switch 35. A lighting system is also supplied with current from the generator or from the battery, according to circuit conditions. The lighting system comprises the head lights 36, the side lights 37 and the tail light 38 of an automobile. The lamp circuits are controlled by manually operated switches 39.

It may be assumed that the generator 1 is operatively connected to the engine of an automobile (not shown). When the engine is started to drive the generator, current flows from one brush of the generator through the series coil 11, contact member 24, shunt coil 10, and shunt field winding 28 to the other brush of the generator. The armature 17 is normally held upward by the spring 19. As the generator speed increases and a predetermined voltage is reached, at which the coils 10 and 11 are sufficiently energized, the armature 17 is drawn downwardly. The contact members 23 and 24 then close a circuit for charging the battery. Current flows from one brush of the generator through the series coil 11, contact members 24 and 23, armature 17, spring 19, contact members 21 and 22, battery 29 and the field winding 27 to the other terminal of the generator. The battery will be charged as long as the generator voltage exceeds that of the battery.

If, from any cause, such as a decrease in the engine speed, the generator voltage falls below that of the battery, the direction of flow of current in the charging circuit will be reversed. The coil 11, which normally assists the coil 10, now opposes the latter. Consequently, the armature 17 is drawn upward by the spring 19 and the circuit is broken by the separation of the contact members 23 and 24. The cut-out will not operate to close the circuit again until the generator voltage has reached a predetermined value and is above that of the battery.

Various changes in the structure of my invention may be made by one skilled in the art. For example, the chamber 5 may be made large enough to contain the entire cut-out, and a detachable cover provided for the same.

It will be understood that such modifications may be made, without departing from the spirit of my invention, as fall within the limits of the appended claims.

I claim as my invention:

1. In combination, a casing member, a cutout having pole pieces bent at right angles and extending inwardly, means for attaching said pole pieces to said casing, said means forming an extension for said pole pieces, an armature for said cutout, and a detachable cover for said armature and said extensions.

2. A cut out comprising a casing, a core member, pole pieces bent at right angles and a coil within said casing, members extending through said casing at right angles to said core member and connected to said pole pieces, and a movable armature member coacting with said extending members.

3. A cut out comprising a casing having a chamber, a core member and pole pieces inclosed and supported by said casing, extensions for said pole pieces projecting through said casing, a movable armature member coacting with said extensions, and a removable cover for said armature member.

4. A cut out comprising a supporting member, a core member, means for connecting said core member to said supporting member, said means comprising members bent at right angles and members extending through said casing, a coil surrounding said core member, a contact member upon and insulated from said supporting member, an armature member coacting with said connecting means, and a contact member carried by the armature member for coacting with the other contact member.

In testimony whereof, I have hereunto subscribed my name this 29th day of March 1913.

FRANK CONRAD.

Witnesses:
R. E. CULLINGS,
B. B. HINES.